United States Patent
Gärtner

[11] 3,756,092
[45] Sept. 4, 1973

[54] SCREW DRIVE

[76] Inventor: Robert Gärtner, Freiherr vom Stein Str. 8, 6308 Butzbach, Oberhessen, Germany

[22] Filed: Dec. 2, 1971

[21] Appl. No.: 204,166

[30] Foreign Application Priority Data
Dec. 3, 1970 Germany ............... P 20 59 528.2

[52] U.S. Cl. ............................ 74/424.8 A, 74/459
[51] Int. Cl. ....................... F16h 1/18, F16h 55/22
[58] Field of Search ............... 74/424.8 A, 459, 74/458, 424.8 R

[56] References Cited
UNITED STATES PATENTS

| | | |
|---|---|---|
| 2,556,572 | 6/1951 | Brinkhurst ............... 74/424.8 A |
| 2,430,458 | 11/1947 | Farrell ..................... 74/424.8 A |
| 2,443,020 | 6/1948 | Beier ............................. 74/459 |
| 3,487,709 | 1/1970 | Zeiber, Jr. .................. 74/458 X |

*Primary Examiner*—Leonard H. Gerin
*Attorney*—Walter Becker

[57] ABSTRACT

A screw drive with a threaded spindle and with a screw member having an inner thread for threaded engagement with the spindle thread in which the inner thread of said screw member has a greater diameter than the spindle thread and in which the screw member is eccentrically arranged with regard to the longitudinal axis of the spindle and is adapted to rest on bearing means or roller means of a frame guided by the spindle.

8 Claims, 4 Drawing Figures

Patented Sept. 4, 1973  3,756,092
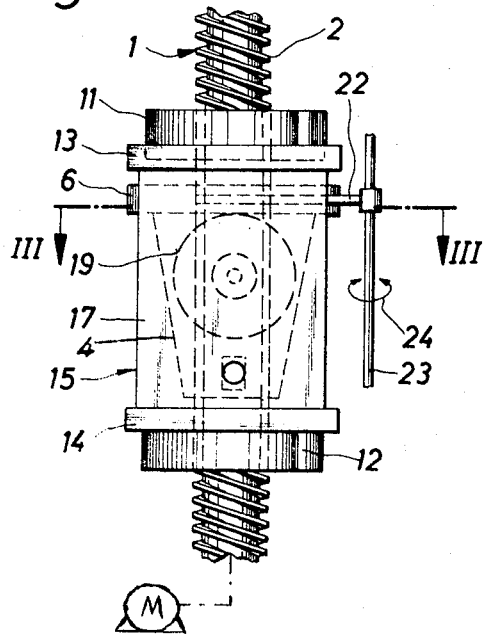
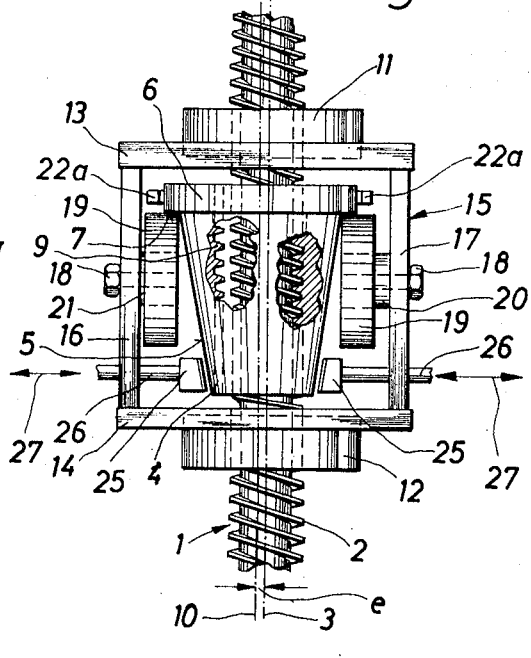
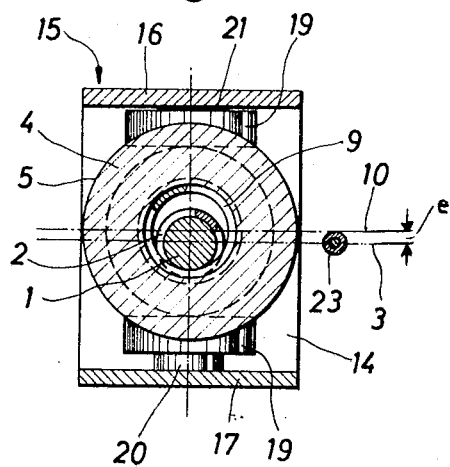
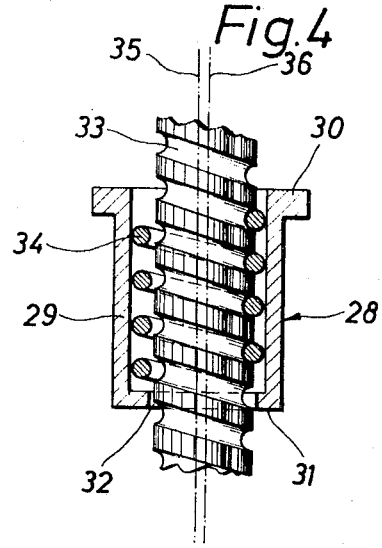

SCREW DRIVE

The present invention relates to screw) drive with a spindle and a screw having an inner thread threadedly engaging the thread of the spindle.

It has already been suggested by rolling annular or disc-shaped rolling elements on the screw spindle to avoid sliding friction, wear and the like, in order to obtain a high degree of efficiency. In this connection, however, it was considered a drawback that the working stroke of the rolling element during one spindle revolution always equaled the pitch of the spindle thread.

Considering this problem, it is an object of the present invention to provide a device in the form of a screw drive, in which the working stroke per spindle stroke or per spindle revolution will be less than the pitch of the spindle thread and may be freely selected in view of the respective structure of the device.

This object and other objects and advantages of the invention will appear more clearly from the following specification in connection with the accompanying drawing, in which:

FIG. 1 is a side view of a screw drive according to the invention.

FIG. 2 is a front view of the drive syhown in FIG. 1.

FIG. 3 represents a section taken along the line III — III of FIG. 1.

FIG. 4 is a further embodiment of the screw for a device according to the invention.

The screw drive according to the present invention which is provided with a spindle and a screw having its inner thread threadedy engaging the spindle thread is characterized primarily in that the inner thread of the screw has a greater diameter than the spindle thread and that the screw is eccentrically arranged with regard to the longitudinal axis of the spindle and in longitudinal direction rests on bearing means or wheels of a frame guided by the spindle.

According to a further development of the invention, the screw is provided with an outer collar on which the wheels or bearing means of the frame roll.

According to still another feature of the invention, the screw axis extends parallel to the spindle axis wyhich means that in contrast to heretofore known devices of the type involved it does not carry out a tumbler movement around the spindle, but instead the screw is guided always in parallel arrangement with regard to the spindle axis.

Preferably, the wheels or bearing means engage the outside of the screw so that the latter is guided by the wheels. To this end, the screw is advantageously of a conical design so that the wheels or bearing means, on one hand, engage the collar of the screw but, on the other hand, also guide the screw on its conical mantle. The wheels or bearing means of the frame, therefore, are able to take over the function of transferring the load and of radially guiding the screw and thus the eccentric guiding of the screw.

In order to be able to set the eccentricity of the screw with regard to the spindle, spacer means may be provided between the wheels and the frame struts which are parallel to the spindle. By selecting different discs or spacer means, the eccentricity of the screw relative to the spindle may be varied.

According to a further embodiment of the invention, the eccentricity of the screw may also be varied in steps by means of a fork which embraces the screw and is pivotable. Such forks are known in connection with shiftable clutches, however, the shifting movement is carried out about an axis parallel to the spindle.

According to still another feature of the invention, the upper or lower end face plate of the frame carries an antifriction bearing or the like which slidably embraces the spindle. By means of this bearing, the frame is guided on the spindle, while the frame axis in its turn is precisely centrically arranged with regard to the spindle axis.

The turning movement of the screw may furthermore be changed in a infinitely variable manner by means of a brake, or the screw may even be arrested.

By braking or arresting the screw or by the eccentricity of the screw, the transmission ratio of the drive may be varied. When providing a brake and a shiftable fork, this adjustment may be effected in a stepless manner so that an infinitely variable transmission ratio with a high degree of efficiency will be provided by the present invention. Such transmission, as mentioned above, affords the possibility of obtaining per spindle revolution a shorter stroke than the pitch of the spindle thread and makes it even possible by simple means to realize various and different feeding speeds.

Referring now to the drawing in detail, the spindle 1 with its screw thread 2 is rotatable about the longitudinal axis 3 of the spindle. Spindle 1 obtains its rotary movement in a manner known per se by any suitable driving means ( not shown), for instance, a motor.

Arranged around the spindle 1 is a screw 4 which has a conical outer circumference 5 and has its upper marginal area provided with a collar 6 having a lower annular surface 7. While the drawing shows the spindle in a vertical position, it should be noted that the spindle may also have any other position, for instance, may be inclined or may have a horizontal position.

As will be seen from the drawing, the bore of the screw 4 has a thread 9 which corresponds to the thread 2 of the spindle 1. However, the diameter of the inner thread of the screw 4 is greater than the diameter of the thread 2 of spindle 1. FIG. 2 also shows on the right-hand side of spindle 1 the thread of spindle 1 meshing with the thread 9 of the screw 4, whereas on the left-hand side of spindle 1 the two threads are not in engagement with each other. This is due not only to the different sizes of the two threads 2 and 9 but also due to the eccentric position of screw 4 with regard to spindle 1. According to FIG. 2, the screw 4 with its axis 10 is laterally offset to axis 3 by the eccentricity e. Screw 4 with its axis 10 remains always parallel to the axis 3 of the threaded spindle 1.

The spindle 1 is above and below the screw 4 surrounded by two ball bearings 11 and 12 when the spindle is horizontally journalled on both sides of screw 4. The inner ring of these ball bearings is adapted to slide on the thread 2 of spindle 1 while the threaded spindle is able to guide the two bearings. The bearings 11, 12 are respectively connected to the end plates 13, 14 of a frame 15 to which is conveyed the load, for instance a machine frame to be lifted.

The plates 13, 14 through which the spindle 1 extends have two struts 16, 17 which are located opposite to each other and are parallel to the longitudinal axis 3 of the spindle 1. By means of screw bolts 18, one wheel or bearing each is held on said struts. The wheels 19 may be supported by combined bearings adapted to absorb a radial and an axial pressure.

Between the struts 16, 17 and the wheels or bearings there are provided different spacer members 20, 21 by the thickness of which it is possible to determine the eccentricity $e$ of screw 4 relative to spindle 1.

As will be seen from FIGS. 1 and 2, the wheels 19 roll on the collar 6 of screw 4 and simultaneously guide the conical screw 4. In this way the wheels 19 take over the task of conveying a load and guiding the screw 4 which is eccentric with regard to the spindle 1. The eccentric guiding of the screw 4 may, however, also be realized by other means arranged on frame 15.

At the level of the collar 6 there is provided a fork 22 the two fork portions 22a of which surround the collar 6 on both sides as is known, for instance, in connection with the clutch jaws of a clutch. Fork 22 is arranged on a vertical bar 23 which is rotatable about its longitudinal axis in the direction of the double arrow 24 and is also adapted to be arrested. By means of this fork and while omitting the spacer members 20, 21, it is possible in a stepless manner to vary the eccentricity of screw 4 relative to the spindle while the wheels 19 are displaced on the screw bolt 18. At the level of the lower end of screw 4 there are provided two jaws 25 which are arranged diametrically opposite to each other and are mounted on holding means 26 which are uniformly adjustable in the direction of the arrows 27 (FIG. 2). Without varying the eccentricity $e$ between the spindle axis 3 and the screw axis, the two jaws 25 may be adjusted in such a manner that they will act as a brake with regard to screw 4 so that the speed of the screw can be varied in a stepless manner. The jaws or shoes may be pulled to such an extent that the screw 4 will stop By varying the eccentricity $e$, preferably in a stepless manner, for instance by steplessly braking the screw by means of the shoes 25, a stepless working of the transmission can be realized.

According to the embodiment of FIG. 4, the screw 28 comprises a cylinder 29 carrying a collar 30 and an inwardly directed flange 31 defining an opening 32 through which the spindle 33 can freely extend. The thread of screw 28 is, according to the specific illustration, formed by an inserted threaded wire 34 which in any suitable manner, for instance by welding or cementing, is connected to the cylindrical part 29. When making the screw 29 of a suitable synthetic material of corresponding strength, a simple shape of the screw is obtained the inner thread of which is again greater than the spindle thread, said screw is again greater than the spindle thread, said screw likewise being arranged eccentrically with regard to the spindle. The screw according to FIG. 4 is substantially the same as described above in connection with the embodiment of FIGS. 1 to 3.

It is, of course, to be understood that the present invention is, by no means, limited to the particular showing in the drawing but also comprises any modifications within the scope of the appended claims.

What I claim is:

1. A screw drive which includes: a spindle with an outer thread, a hollow screw member provided with an inner thread of a larger diameter than the diameter of said spindle thread, said screw member surrounding said spindle while being adapted by means of its inner thread threadedly to engage said spindle thread means for eccentrically arranging and maintaining said screw member with regard to said spindle, frame means including means slidable on said spindle thread and comprising means engageable with said screw member, said screw member having a shoulder therewith, and means engagable with said screw member comprising bearing means adapted to roll on and along said shoulder.

2. A screw drive which includes: a spindle with an outer thread, a hollow screw member provided with an inner thread of a larger diameter than the diameter of said spindle thread, said screw member surrounding said spindle while being adapted by means of its inner thread threadedly to engage said spindle thread means for eccentrically arranging and maintaining said screw member with regard to said spindle, frame means including means slidable on said spindle thread and comprising means engagable with said screw member, said screw member having a collar, and the means engagable with said screw member comprising roller means adapted to roll on and along said collar.

3. A screw drive according to claim 2, in which the axis of said screw member is substantially parallel to the axis of said spindle.

4. A screw drive according to claim 2, in which the roller means engage the outside of said screw member.

5. A screw drive according to claim 2, in which the means for eccentrically arranging and maintaining said screw member includes spacer means between said roller means and portions of said frame means.

6. A screw drive according to claim 5, in which said frame means is provided with bearing means slidably surrounding said spindle.

7. A screw drive which includes: a spindle with an outer thread, a hollow screw member provided with an inner thread of a larger diameter than the diameter of said spindle thread, said screw member surrounding said spindle while being adapted by means of its inner thread threadedly to engage said spindle thread means for eccentrically arranging and maintaining said screw member with regard to said spindle, frame means including means slidable on said spindle thread and comprising means engagable with said screw member, and brake means arranged outside said screw member and operable selectively to control the rotary movement of said screw member.

8. A screw drive which includes: a spindle with an outer thread, a hollow screw member provided with an inner thread of a larger diameter than the diameter of said spindle thread, said screw member surrounding said spindle while being adapted by means of its inner thread threadedly to engage said spindle thread means for eccentrically arranging and maintaining said screw member with regard to said spindle, frame means including means slidable on said spindle thread and comprising means engagable with said screw member, and pivotable fork means operable to engage said screw member and to vary its eccentricity with regard to said spindle in an infinitely variable manner.

* * * * *